No. 868,720. PATENTED OCT. 22, 1907.
A. A. ST. JOHN.
SPLICE BAR AND NUT LOCK.
APPLICATION FILED FEB. 5, 1907.
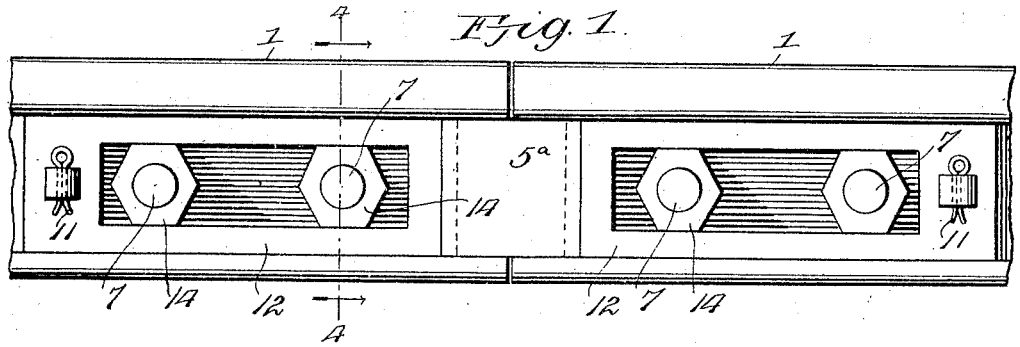
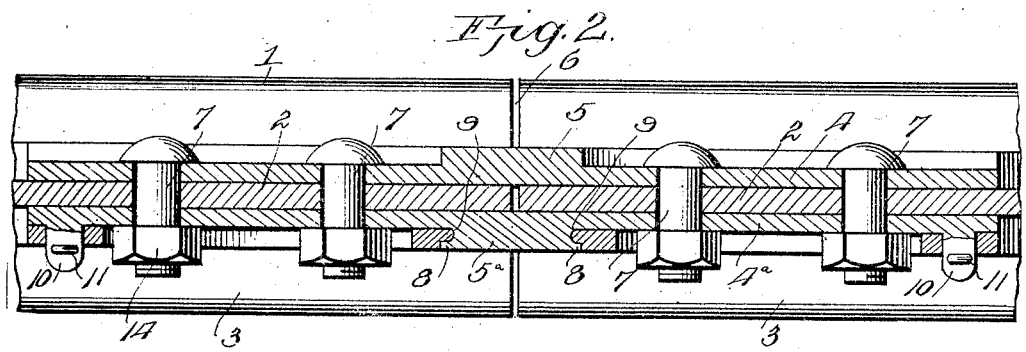
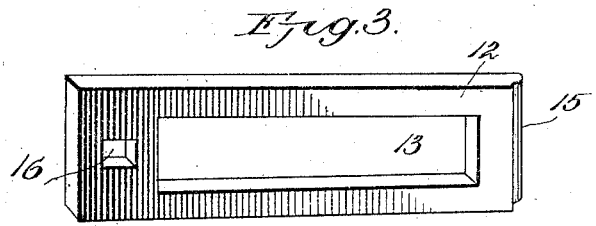
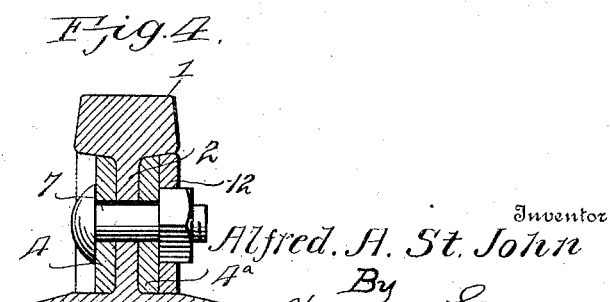
Inventor
Alfred. A. St. John
By
Victor J. Evans
Attorney
Witnesses
Frank Hough

UNITED STATES PATENT OFFICE.

ALFRED A. ST. JOHN, OF NEW BEDFORD, MASSACHUSETTS.

SPLICE-BAR AND NUT-LOCK.

No. 868,720.　　　　Specification of Letters Patent.　　　　Patented Oct. 22, 1907.

Application filed February 5, 1907. Serial No. 355,889.

*To all whom it may concern:*

Be it known that I, ALFRED A. ST. JOHN, a citizen of the United States of America, residing at New Bedford, in the county of Bristol and State of Massachusetts, have invented new and useful Improvements in Splice-Bars and Nut-Locks, of which the following is a specification.

This invention relates to splice bars and nut locks for railway rails and one of the principal objects of the same is to provide means for firmly holding the meeting ends of railway rails and to lock the nuts upon the bolts so that they will not turn off said bolts.

Another object of my invention is to provide a rail splice and nut lock of simple construction which will prevent the spreading or creeping of the rails and which will hold the bolts and nuts in place for securing the meeting ends of the rails together.

Still another object of the invention is to provide simple and reliable means for holding the nuts on the bolts which will permit ready removal of the nut lock for readjustment of the nuts on the bolts.

The foregoing and other objects may be attained by means of the construction illustrated in the accompanying drawing, in which:

Figure 1 is a side elevation of a rail joint united by my improved splice bar and nut lock. Fig. 2 is a sectional view of the same through the web of the rail and through the splice bars. Fig. 3 is a perspective view of one of the nut locks. Fig. 4 is a vertical section on the line 4—4, Fig. 1, looking in the direction indicated by the arrows.

Referring to the accompanying drawings for a more particular description of my invention, the numeral 1 designates the ends of the meeting rails, 2 is the web portion thereof, and 3 is the base flange of said rails, the same being of the usual construction. The splice bars, secured at opposite sides of the webs of the rails, consist of a fish plate or bar 4 having a thickened portion 5 at the central point which extends by the rail joint 6, said bar having the usual bolt holes for the bolts 7. Upon the opposite side of the web 2 of the rails, the bar 4ᵃ is provided with an enlarged or thickened portion 5ᵃ having vertical flanges 8. Extending outward from an undercut groove 9 and near the outer end of said bar 4ᵃ, are lugs 10 provided with vertical apertures or cotter pins 11. The nut locks each consist of a bar or plate 12 having an oblong aperture 13 therein to fit over the nuts 14 and to prevent them from turning therein. A tongue 15 is provided at one end of said nut lock, said tongue adapted to fit within the groove 9 in the enlarged portion 5ᵃ of the bar 4ᵃ, and the opposite end of the nut lock having an aperture 16 through which the lug 10 passes.

When the nut locks 12 are secured in place, they are held by means of the cotter pins 11 and can be readily removed whenever it is required to readjust the nuts 14 on the bolts 7.

From the foregoing it will be obvious that my rail splice will firmly hold together the meeting ends of rails; will not permit the nuts to turn upon the bolts; will permit the ready removal of the nut lock for readjustment, and does not require any alteration in the present form of the rail ends.

Having thus described the invention, what I claim is:

1. A rail splice comprising oppositely disposed bars secured at the sides of the rail webs and provided with central enlargements, one of said bars having oppositely disposed vertical flanges and undercut grooves, nut locks provided with tongues to fit said grooves and apertures to fit the nuts on the bolts, and means for holding said nut lock in place, substantially as described.

2. A splice for railway rails comprising bars secured at opposite sides of the webs of the rails, one of said bars having oppositely disposed grooves, and nut locks provided with tongues to fit said grooves and means to prevent the turning of the nuts on the bolts, substantially as described.

3. A splice bar for rails provided with oppositely disposed grooves, in combination with nut locks fitted to said grooves and provided with means for preventing turning of the nuts, said splice bar having outwardly projecting lugs which extend through openings in the nut lock, and cotter pins fastened to the lugs for holding the nut lock in place, substantially as described.

In testimony whereof, I affix my signature in presence of two witnesses.

ALFRED A. ST. JOHN.

Witnesses:
　JOSEPH M. ROY,
　DAVID BONIN.